Jan. 28, 1930. W. E. PLANK 1,745,117
STEERING MECHANISM FOR TRAILERS
Filed March 7, 1928 2 Sheets-Sheet 2

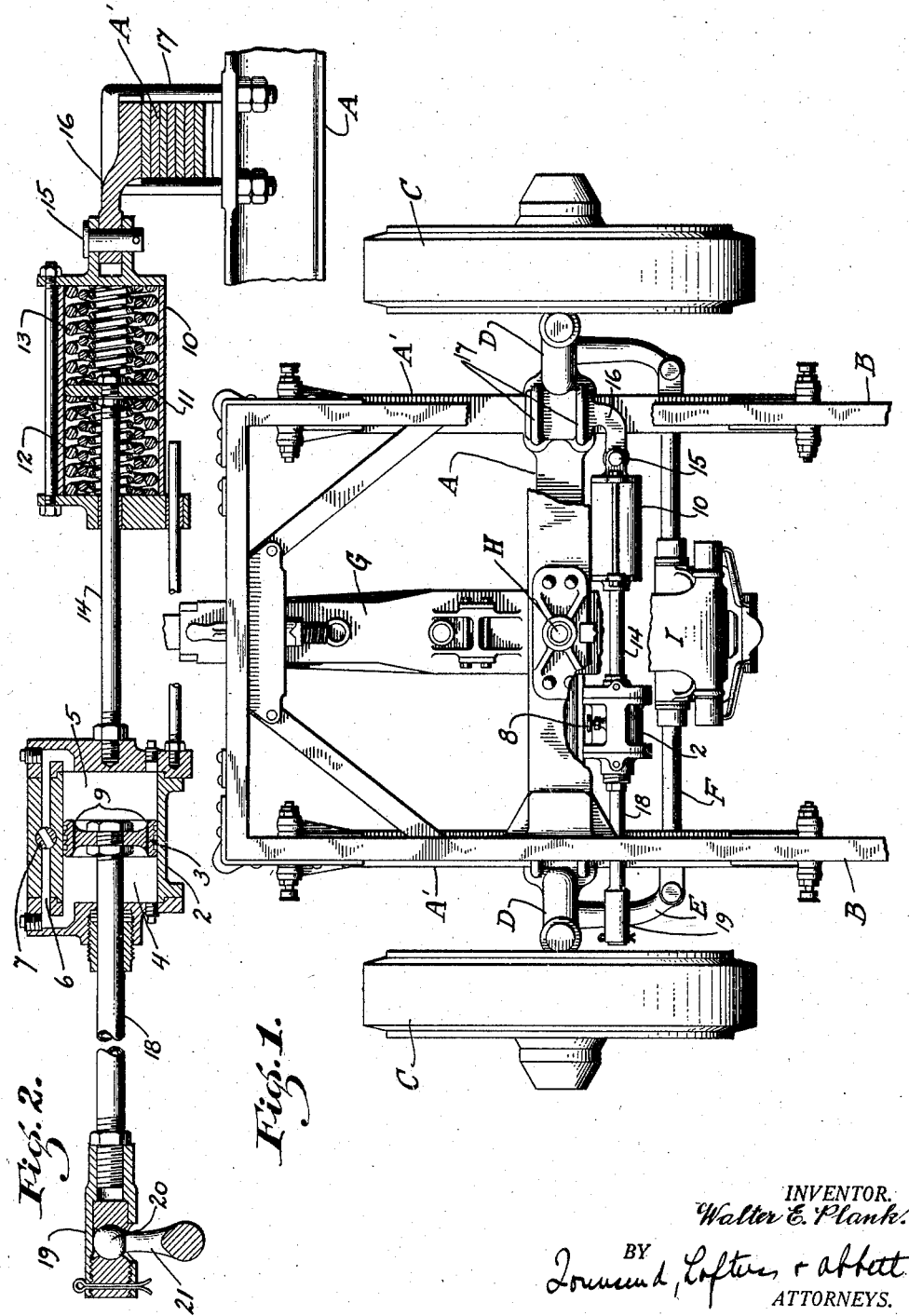

INVENTOR.
Walter E. Plank.
BY
Townsend, Loftus & Abbett
ATTORNEYS.

Patented Jan. 28, 1930

1,745,117

UNITED STATES PATENT OFFICE

WALTER E. PLANK, OF SAN FRANCISCO, CALIFORNIA

STEERING MECHANISM FOR TRAILERS

Application filed March 7, 1928. Serial No. 259,660.

This invention relates to a steering mechanism stabilizer for trailers, and especially to improvements in the structure disclosed in my former Patent No. 1,631,332, issued June 7, 1927, and entitled "Steering mechanism stabilizer for trailers."

The stabilizer disclosed in the patent above referred to embodied a pair of balanced compound helical springs which served the purpose of preventing weaving or side-swaying of the front wheels of the trailer, and while the springs function to prevent weaving, several faults and objections were encountered, among which will be mentioned—

1. When equipped with springs powerful enough to prevent weaving it was almost impossible to swing the trailer around by hand, as the springs were always in tension, causing the draw-bar to point to normal or straight ahead. This made swinging the vehicle by hand difficult and it was apparently mechanically impossible to relieve the mechanism of this fault.

2. The resistance was progressive—that is, the resistance increased in direct proportion to the angle of the draw-bar with relation to the axle. This was objectionable as the maximum resistance should be offered at the beginning of the arc and should remain constant.

3. It was impossible to standardize the stabilizer. Every trailer was a special job and the installation comparatively difficult.

4. The springs were constantly under tension and frequently solid, and as such would quickly lose elasticity and cause breakage.

The object of the present invention is in general to overcome the objections above specified; to generally improve and simplify the construction and operation of stabilizers; to provide a stabilizer which will effectively resist and cushion shocks and thrusts imparted by weaving; to provide a stabilizer which will yield readily under slow pressure so as to permit the draw-bar to be swung by hand; to provide a stabilizer which employs both spring and hydraulic cushioning means; to provide a by-pass valve in the hydraulic circuit which may be manually opened to permit free swinging movement to the draw-bar, and further, to provide a stabilizer which may be readily attached to trailers of varying tonnage without change of standardized equipment.

The invention is shown by way of illustration in the accompanying drawings, in which—

Fig. 1 is a plain view of the front end of the trailer, said view being partially broken away to show the attachment of the stabilizer.

Fig. 2 is a central, vertical, longitudinal section through the stabilizer mechanism.

Figure 3:
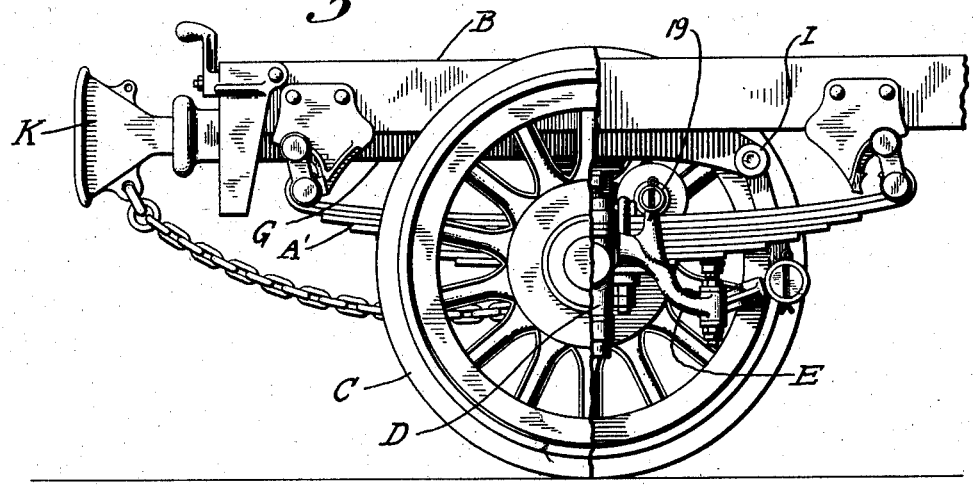
Fig. 3 is a side elevation of the front end of a trailer, said view being partly broken away to disclose the position of certain parts of the stabilizer.
Figure 4:
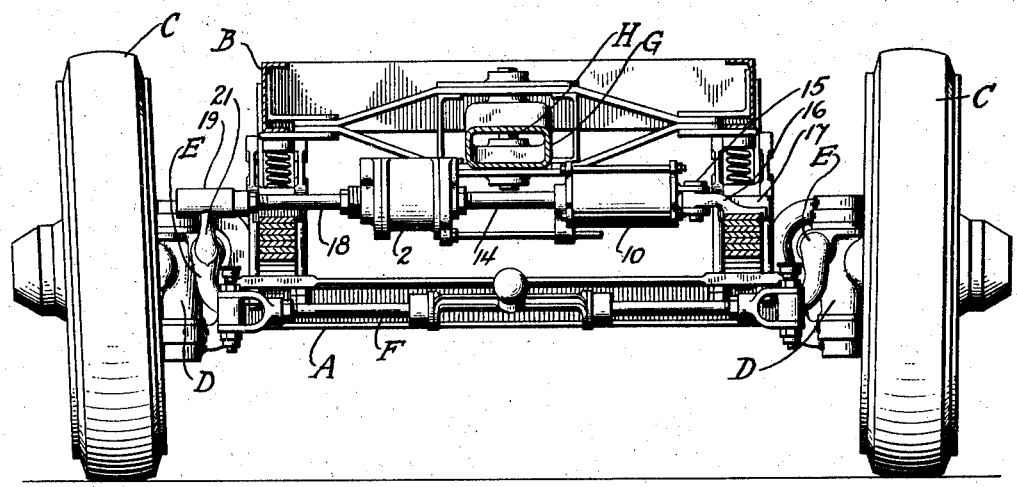
Fig. 4 is an end view of the front end of a trailer, said view being partially in section.

Referring to the drawings in detail, and particularly Figures 3 and 4, A indicates the front axle of a trailer or like vehicle; A' the semi-elliptical springs; B the frame supported thereby; C the front or steering wheels; D the steering knuckles through which steering movement is transmitted to the wheels; E the steering knuckle arms; and F the tie-rod connecting the same.

The trailer here shown is provided with a draw-bar G secured to the frame by means of a king bolt H and it is provided with a rearward extension I through which movement is transmitted to the tie-rod F, the steering arms E and the wheels C. The draw-bar G may be directly connected to the tractor or truck pulling the same or it may be connected thereto through an intermediate draw-bar such as illustrated at K.

A trailer as ordinarily constructed cannot possibly exceed a predetermined speed, nor can it be loaded beyond a predetermined capacity, as weaving or side-whip in the front wheels becomes so great as to render any increase in load or speed hazardous. The weaving or side-sway is caused by lost motion in the steering mechanism. For instance, lost motion to a small degree may be found in the connection formed between the extension on the draw-bar and the tie-rod. Lost motion is again obtained between the ends of the tie-rod and the respective steering arms, and more or less lost motion may also be encountered in the steering knuckles and the wheel spindles. While the lost motion in each connection may be fairly small, it is obvious that it is multiplied through the different connections, and it is this multiplied lost motion that causes and permits side-sway and weaving of the front or steering wheels. This side-sway, as previously stated, increases with speed changes and load increase and limits the maximum speed of the trailer, as the strain or pull of the steering mechanism when certain speeds and loads are exceeded become so great as to cause excessive wear and in many cases breakage and wrecks.

The stabilizing mechanism forming the subject matter of the present application overcomes the objections referred to, and it also overcomes the objections referred to in connection with the structure shown in my prior patent. The stabilizer mechanism briefly stated consists of combination spring and hydraulic cushioning mechanism interposed between a fixed part of the vehicle and one of the steering arms. The mechanism resists and cushions sudden shocks and thrusts but it permits normal steering or swinging of the wheels when rounding curves, corners, or the like.

The mechanism is best illustrated in Figures 1 and 2. It consists of a cylinder 2, interior of which is mounted a piston 3 which divides the cylinder into a pair of chambers 4 and 5. These chambers are filled with oil or a like fluid, and the chambers are connected by a by-pass passage 6 in which is mounted a valve 7. This valve is normally closed, so as to prevent free movement of oil from one side of the piston to the other, but it may be manually opened by means of a handle 8 when it is desired to swing the draw-bar to the front wheels by hand, as will hereinafter be described.

The piston is provided with one or more small ports such as shown at 9 and the piston may thus move slowly from one end of the cylinder to the other, but when sudden shocks or loads are imposed the piston and cylinder will move as a unit, and under such conditions its movement will be cushioned by a spring mechanism generally indicated at 10. This mechanism consists of a cylinder, interior of which is mounted a collar or disk 11. A series of helical compression springs 12 and 13 are placed between the opposite ends of the cylinder and the disk, and movement of the disk is thus cushioned in both directions. The disk is connected with the cylinder 2 by means of a rod 14. Hence, when the cylinder is moved bodily, as previously stated, in either direction, its movement will be cushioned and resisted by one or another of the springs 12 or 13, depending upon the direction of movement. The spring cylinder 10 is in this instance pivotally attached as at 15 to a bracket 16 which in turn is secured by U bolts or clips 17 to the axle A. The piston 3 in the cylinder 2 is provided with a rod 18. This rod terminates in a socket connection 19 and this engages a ball 20 formed on the upper end of an arm 21 which forms an extension or part of one of the steering arms E.

The stabilizer constructed as described has a number of advantages. It will effectively resist a sudden thrust in either direction and as such will cushion and resist the type of thrust which is imparted by weaving or sidesway of the front wheels. The stabilizing mechanism will yield readily to a slow regular pressure. For instance, when rounding a turn or a corner, as the ports 9 in the piston are sufficient to permit the oil to pass from one side of the piston to the other. Also it permits the draw-bar to be swung by hand if done slowly. If the trailer is disconnected and it is desired to move it about with as little resistance as possible, the by-pass valve 7 may be opened and the piston will then be free to move without any resistance in either direction.

The resistance provided is not progressive. For instance, when certain size springs are placed under a compression of ⅛th of an inch, a pressure of 180 pounds is produced, and if the piston 7 is truly proportioned it will exert approximately 15 pounds pressure per square inch thereon. This is sufficient to cause the oil in the cylinder to flow through the ports in the piston. Hence, the pressure seldom, or never, gets any greater than 180 pounds and ceases as soon as the draw-bar has reached the desired angle, at which position it will stay until it is moved back to normal or to some other angular position. During such movement the device will offer the same resistance, whatever the direction of movement. The resistance is affected in proportion to the speed of rotation of the draw-bar about the king pin, and not upon the amount of rotation. If the speed of movement is too great to permit the oil to pass through the ports in the piston, the movement is taken up by the springs 12 or 13.

The mechanism is simple and substantial in construction. It permits one standard size of mechanism to be attached to trailers from 3 to 10 tons capacity. No change is required when applying the mechanism to different vehicles, except in the design of the bracket plates 16 and the ball-and-socket connection indicated at 19 and 20. This must necessarily be changed to suit different makes of trailers. Except a 3/32nds inch or so deflection to take up slack and to prevent rattling, there is normally no pressure on the springs 12 and 13. Hence, the springs will have a long life.

A dash pot alone, to be efficient, operates slowly and offers resistance to a sudden thrust to such a degree that the primary thrust rod would be liable to injury were not the blow absorbed momentarily by some quick acting resilient member functioning as a cushion. In this instance, the disk 11 in the spring cylinder acts as a buffer plate as it rests midway between two equal sets of spring cushions. The disk is attached to a secondary thrust-rod 14 which in turn is fastened to the main body of the oil cylinders 2. The cylinders 2 and 10 are thus connected in series and they accordingly cushion one another and offer protection against sudden shocks and thrusts.

While certain features of the present invention are more or less specifically described, I wish it understood that various changes may be resorted to within the scope of the appended claims; similarly, that the materials and finishes of the several parts employed may be such as the manufacturer may decide or varying conditions or uses may demand.

Having thus described my invention, what I claim and desire to secure by Letters Patent is:

1. In a vehicle of the character described an axle, a steering knuckle on each end thereof, a wheel on each steering knuckle, a pair of connected steering arms, one on each knuckle, a hydraulic cylinder, a rod connected with one end of the cylinder, a resilient connection between the rod and a fixed member on the vehicle, a ported piston in the cylinder and a rod connected with the piston at one end and with the steering arms at the other end.

2. In a vehicle of the character described an axle, a steering knuckle on each end thereof, a wheel on each steering knuckle, a pair of connected steering arms, one on each knuckle, a hydraulic cylinder, a resilient connection between the cylinder and a fixed support, a piston in the cylinder, a piston rod, a connection between the piston rod and one of the steering arms, and a by-pass valve in the cylinder adapted to be opened to permit free movement of the piston in the cylinder.

3. In a vehicle of the character described an axle, a steering knuckle on each end thereof, a wheel on each steering knuckle, a steering arm on each knuckle, a tie rod connecting the steering arms, a hydraulic cylinder, a resilient connection supporting the cylinder with relation to the axle, a piston in the cylinder and a piston rod connected at one end with the piston and at the opposite end with one of the steering arms.

WALTER E. PLANK.